United States Patent [19]
King et al.

[11] 3,918,460
[45] Nov. 11, 1975

[54] IMPLANTABLE ELECTRICAL MEDICAL DEVICE WITH BATTERY GAS VENTING MEANS

[75] Inventors: Wendell L. King, Isanti; Kenneth B. Stokes, Minneapolis, both of Minn.

[73] Assignee: Medtronic, Inc., Minneapolis, Minn.

[22] Filed: July 5, 1974

[21] Appl. No.: 485,951

[52] U.S. Cl. ............................ 128/419 P; 136/177
[51] Int. Cl.² .......................................... A61N 1/36
[58] Field of Search ..... 128/1 R, 405, 419 C, 419 E, 128/419 P, 419 PS, 419 R, 421, 422; 136/177, 179

[56] References Cited
UNITED STATES PATENTS

| | | | |
|---|---|---|---|
| 3,690,325 | 9/1972 | Kenny | 128/419 P |
| 3,741,812 | 6/1973 | Spellman et al. | 136/177 |
| 3,791,377 | 2/1974 | Norby et al. | 136/177 |
| 3,842,842 | 10/1974 | Kenny et al. | 128/419 P |

*Primary Examiner*—William E. Kamm
*Attorney, Agent, or Firm*—Schroeder Siegfried Ryan & Vidas

[57] ABSTRACT

An implantable electrically actuated medical device having one or more electrochemical cells and operative electric circuitry mounted in a metallic container, all of which are positioned in a spacer member made of a material which is highly permeable with respect to hydrogen gas, relatively impervious to liquids, and bonds well with epoxy resin. The device is encapsulated with an epoxy resin which is relatively impermeable to hydrogen gas and is impermeable to body fluids. The device incorporates an additional path or means which is highly permeable to hydrogen gas and impervious to fluids which may be formed integral with the spacer and be in the form of pins positioned around the same to position the spacer with the components therein during encapsulation and which extend through the encapsulation. The path may also be in the form of a ridge around a recess in the spacer mounting the electronic components to strengthen the same and provide the path for hydrogen gas.

10 Claims, 4 Drawing Figures

IMPLANTABLE ELECTRICAL MEDICAL DEVICE WITH BATTERY GAS VENTING MEANS

Our invention relates to an electrically activated medical device such as a cardiac pacer which is adaptable to be implanted in a human body. Such devices are typically covered with an encapsulant plastic that is compatible with body tissue and body fluids.

Devices of this type are normally powered from electrical energy derived from one or more electrochemical cells or batteries usually of the alkaline mercury type. Such cells during discharge react chemically to generate small amounts of hydrogen gas which, unless vented from the implantable device, may subject the device to a substantial pressure buildup internally to produce the risk of bulging and in more severe instances, a splitting of the casing.

Such devices are normally encapsulated in a body tissue compatible epoxy resin which is relatively impermeable to body fluids but also relatively impermeable to hydrogen gas. The choice of encapsulant plastics is limited due to the requirements imposed by not only the stability of the plastic in the body fluids, but also by the requirements of compatibility with body tissue so as to be non-irritating and so forth. Thus, the problem in the encapsulant unit or device which is sealed to prevent the passage of fluids in liquid form therethrough threat of is one in which too rapid gas evolution from the electrochemical cells presents a fracturing of the encapsulant which encases the device. Where the term liquid impervious or impermeable appears, it is meant that no actual liquid transmission takes place although it is recognized that liquid in gaseous form may be transmitted through the resins. Were an implantable device to lose its seal, the presence of body fluids would cause premature deterioration of the cells as well as have an adverse effect on the electrical circuitry of the device. Of course, the possible adverse effects on the body tissue of loss of integrity of the casing are of even greater importance to the maintenance of a hermetically sealed device.

In the present invention, the implantable device is provided with a plurality of electrochemical cells of the type which produce a gas, such as hydrogen, upon discharge and particularly rapid discharge. The electrical circuit components of the device or pulse generator, are mounted in a tin-lead alloy plated copper can member. Both the cells and the can are positioned in a spacer or mounting member which supports the same and adds strength to the overall device. The spacer material is biocompatible and is relatively water resistant as well as providing excellent bond with an epoxy resin encapsulant. The overall spacer with the cells and the pulse generator or device therein is encapsulated in an epoxy resin which is biocompatible and water resistant. The spacer material in addition has a significantly greater permeability to hydrogen than does the epoxy resin encapsulant. The spacer includes positioning pins which extend from the spacer through the epoxy encapsulation to provide a path for the hydrogen gas which is expelled from the cell and which also insures proper positioning of the spacer with the cells and pulse generator therein within the encapsulant. The positioning pins are formed of a material which is relatively highly permeable to hydrogen gas as compared with the epoxy resin encapsulant. This provides an assembly which has a significantly increased free volume surface, namely the spacer and positioning pins for the high permeability of hydrogen gas, to decrease equilibrium pressure within the device resulting in a low equilibrium pressure within the device and reduction in the need for a relatively high burst strength thereof.

It is therefore the principle object of this invention to provide an implantable device in which a spacer means mounting the cells and pulse generator is coupled to the exterior of the device through the encapsulant by a highly hydrogen gas permeable path to decrease equilibrium pressure of hydrogen in the device while in one form simultaneously providing for a reduction in the requirement of a high burst or rupture strength of the device.

The invention will be described with reference to the accompanying drawings of which:

Figure 1:
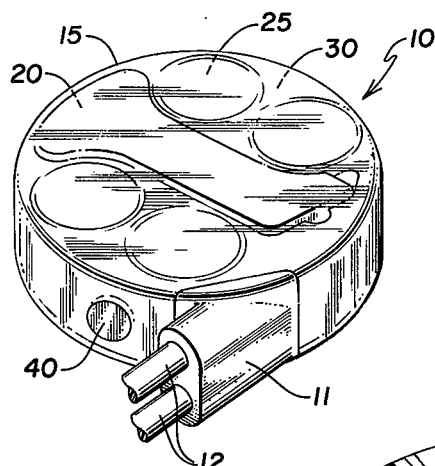
FIG. 1 is a perspective view of the implantable device embodying our invention.

Referring to FIG. 1, the implantable device is shown generally at 10 as a cylindrical member having connector 11 with shielded output lead 12 extending therefrom to be connected to an appropriate electrode in a conventional manner. The device 10 is covered by a layer of epoxy resin 15, as will be seen in the sectional views of FIGS. 2 and 3, and incorporates electric circuitry or a device (the details of which are omitted) mounted in a sealed container 20 which is generally tin-lead plated copper can for electrical conductivity and shielding purposes. The circuitry or device and the electrochemical or power cells 25, four of which are shown, are mounted in a spacer member 30 which is made of a thermoplastic material which has a relatively higher permeability to hydrogen gas than does the epoxy resin covering. The spacer has blind openings or recesses therein to mount the electric cells which are preferably of an alkaline mercury type and to position the encased electric circuitry therein. As shown schematically in FIG. 2, the opposite polarity terminals of the battery appearing on one surface thereof are connected to one another and to the connection points on the case of the electric circuit as shown schematically at 35. Suitable lead connections (not shown) extending therefrom lead to shielded output leads 12 and the electrode (not shown) connected thereto.

Figure 2:
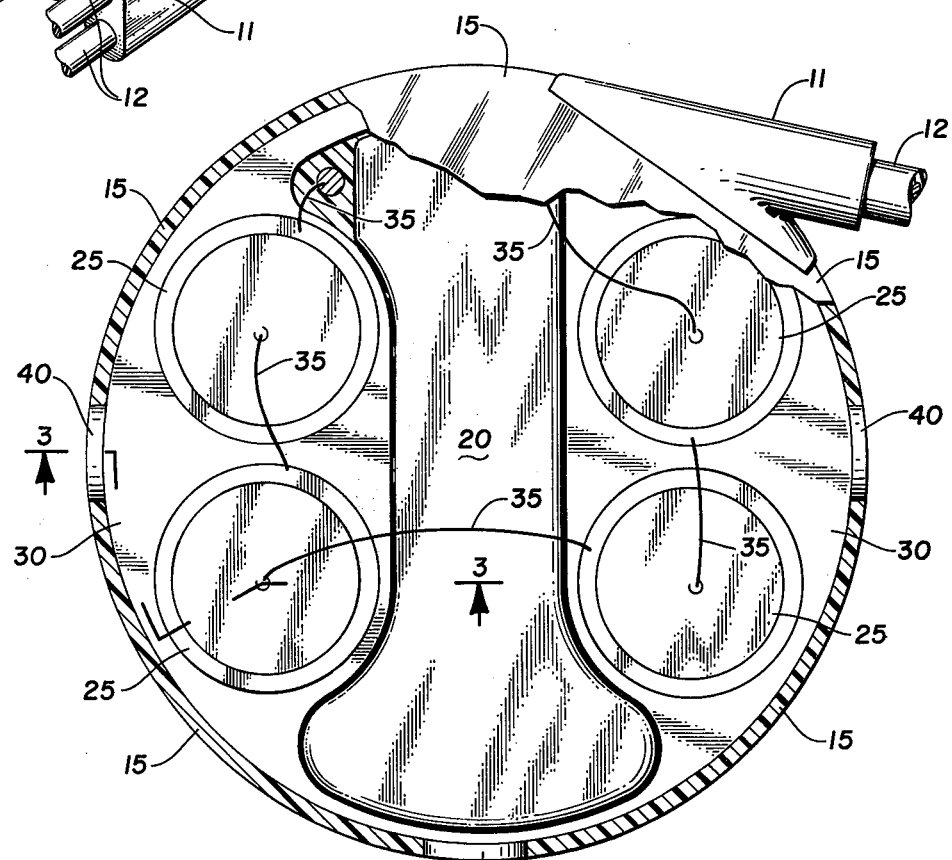
FIG. 2 is a plan view of the implantable device of FIG. 1 with parts broken away.
Figure 3:
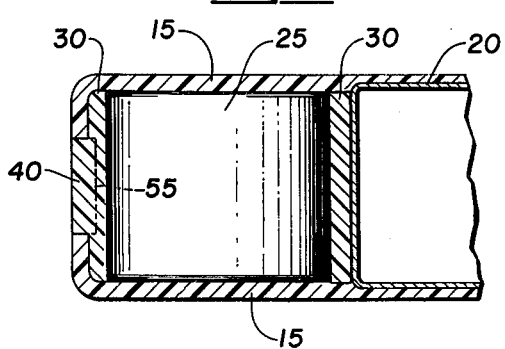
FIG. 3 is a sectional view of the implantable device of FIG. 2 taken along the lines 3—3 therein.

As will be seen in FIGS. 2 and 3, the spacer member has associated therewith positioning pins 40 located around the circumference of the generally cylindrical wall of the spacer. The pins are made of a thermoplastic material which also has a higher permeability of hydrogen gas than does the epoxy resin covering and may be the same material as the spacer. They serve to space the spacer in a mold during the application of the encapsultant epoxy resin thereto. The spacer and the positioning pins are not only of a material having high hydrogen gas permeability but also one which bonds well to the epoxy resin. The spacer adds strength to the device prior to encapsulation and positions the electric cells and the electric circuitry can in the device while providing the form over which the encapsulant or epoxy resin is positioned to provide the relative liquid or moisture impermeable covering and the relatively gas impermeable surface which is biocompatible with the body. In this embodiment, the positioning pins as well as the spacer material provide a storage space and a passage for hydrogen gas evolved from the cells through the encapsulant to decrease the equilibrium pressure within the device and reduce the need for the increased burst strength thereof.

Figure 4:
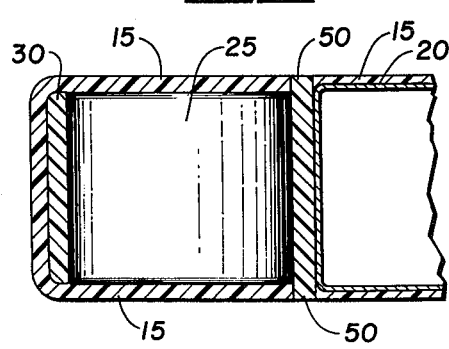
FIG. 4 is a sectional view similar to that of FIG. 3 showing an alternate embodiment of the device.

In the embodiment of FIG. 4, the spacer is provided with a ridge or flange 50 of spacer material surrounding the recess in which the can of the electric circuitry is positioned, this ridge preferably formed integral with the spacer 30 and extending upwardly to enclose or encircle the circuit tin or can 20 which extends beyond the upper surface of the spacer. Thus, this portion of the device will have the minimum thickness of the encapsulant covering and since the tin coating of the circuit enclosure of can 20 has a poor adhesion to the encapsulant, hydrogen gas vented from the cells would normally collect on the surface of the can 20 between the can and the epoxy encapsulant 15 to increase pressure. With the ridge 50 surrounding the edge of the can, the encapsulant 15 is increased in strength since the force applied to the encapsulant will generally be against shear joints instead of against weaker butt joints. In addition, the ridge 50 provides a leakage path for the hydrogen gas and increases in the length of the same increasing the free volume surface of the spacer 30 for hydrogen gas absorption. Thus, even though gas may diffuse through the spacer 30 and into the area above the circuit can 20, the power cells 25 or along the surface of the same, this will not occur precipitously. The more rapid egress of gas prevents rupture. The improved strength provided by ridge 50 further decreases any tendency to burst. The ridge 50 around the blind recess for the circuit can or circuitry may be used in conjunction with the positioning pins as in FIG. 3 (not shown in FIG. 4) or without the same. Similarly, the pins may be formed integral with the spacer member or may be formed separately and may be positioned in locating recesses such as is indicated in phantom at 55 in FIG. 3 in the sides of the spacer.

The spacer may have recesses extending through the spacer (not shown) in either of the embodiments so that both the connection and the vent ends of the cells and both sides of the circuitry can will be exposed to the epoxy. The large surface area of the spacer common with the cells and the passages provided by the positioning pins and/or the reinforcing flanges which may be included on both sides of the spacer, will provide passage for hydrogen gas vented from the cells through the encapsulant covering, since the spacer and the pins are made of a material with a high permeability to hydrogen gas and the epoxy encapsulants are made of a relatively gas impermeable material. Thus, these passages maintain a low equilibrium pressure in the device.

As an example of an implantable electrical device, such as a cardiac pacer, the electrochemical cells may be of conventional types and will preferably be a long life alkaline mercury cell. The electronic circuitry is housed in a metallic container having a thin solder plated copper can surrounding and supporting the same. The spacer is made of a material which is permeable with respect to the hydrogen gas and which bonds well to epoxy resin. It may be of injected molded thermoplastic, such as polyphenylene oxide/polystyrene commercially available under the trademark Noryl manufactured by the General Electric Company. Similarly, the positioning pins and/or the reinforcing rib are preferably made of the same Noryl material or similar material with the same characteristics. It may be molded integral with the spacer or the pins may be separately formed or inserted into the recesses in the walls of the spacer to provide for the positioning of the spacer in the casting of the epoxy encapsulant as well as providing the hydrogen gas path for the device. Castable epoxy resin forming the encapsulant is relatively impermeable to gas and relatively impermeable to fluids and must be biocompatible with the body. Such epoxy resins have been used for sometime and the characteristics are known to those skilled in the art.

What we claim is:

1. An implantable electrically powered medical device, comprising, at least one electrochemical generating cell which produces a gas upon discharge, an electric power actuated device connected to said cell and energized therefrom, a spacer having recesses therein to mount and confine said cell and said device, said spacer being formed of a plastic material having good permeability to hydrogen gas relative to epoxy resins, means connected to the device and providing an output therefrom, a covering of epoxy resin material positioned over and encapsulating said spacer with said cell and device therein, and with the means connected to the device extending therethrough in sealed relationship therewith, and hydrogen permeable means contacting said spacer and extending through said epoxy resin covering defining a conduit for hydrogen gas from the cell through said epoxy resin covering.

2. The implantable electrically powered medical device of claim 1 in which the means contacting the spacer and extending through the epoxy covering are positioning pins for additional locating of said spacer with the cell and device therein within the epoxy covering.

3. The implantable electrically powered medical device of claim 2 in which the spacer is generally cylindrical in form with the recesses therein extending parallel to the axis of the cylindrical form and with the positioning pins extending from the side walls of the cylindrical form of the spacer and being made of the same material as the spacer.

4. The implantable electrically powered medical device of claim 3 in which the positioning pins are uniformly distributed about the cylindrical form normal to the axis of the cylinder form.

5. The implantable electrically powered medical device of claim 3 in which the positioning pins are distributed about the walls of the cylindrical form of the spacer and fit into additional recesses in the walls of the spacer.

6. The implantable electrically powered medical device of claim 2 in which the means contacting the spacer and extending through the epoxy covering is formed integral with the spacer and extend parallel to the axis of the cylinder surrounding the recess for the device.

7. The implantable electrically powered medical device of claim 1 in which the means contacting the spacer and extending through the epoxy covering is also a barrier wall extending around the recess for the device.

8. The implantable electrically powered medical device of claim 1 in which the electrical power actuator device is a pulse generator mounted in a sealed container and located in one of the recesses in the spacer with the means connected to the device being output leads extending therefrom through the wall of the spacer and the epoxy resin covering.

9. The implantable electrically powered medical device of claim 8 in which the recesses in the spacer extend only from one surface of the spacer.

10. The implantable electrically powered medical device of claim 8 in which the spacer is generally cylindrical in form with the recesses therein for the cell and pulse generator extending through the spacer parallel to the axis of the cylindrical form of the spacer.

* * * * *